(12) United States Patent
Kaminski (10) Patent No.: US 8,387,455 B1
(45) Date of Patent: Mar. 5, 2013

(54) BEVERAGE DISPENSER WITH CAPACITIVE LEVEL SENSOR AND DISPLAY AND METHOD

(75) Inventor: Andrzej Kaminski, Warsaw (PL)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 140 days.

(21) Appl. No.: 12/731,436

(22) Filed: Mar. 25, 2010

Related U.S. Application Data (60) Provisional application No. 61/163,603, filed on Mar. 26, 2009.

(51) Int. Cl.
*G01F 23/26* (2006.01)
(52) U.S. Cl. .................................................... 73/304 C
(58) Field of Classification Search ........................ None
See application file for complete search history.

(56) References Cited

U.S. PATENT DOCUMENTS 6,138,508 A * 10/2000 Hannan et al. .............. 73/304 C

FOREIGN PATENT DOCUMENTS

WO   WO 2006044782 A2 *   4/2006

* cited by examiner

*Primary Examiner* — Hezron E Williams
*Assistant Examiner* — Mark A Shabman
(74) *Attorney, Agent, or Firm* — James W. Potthast; Potthast & Associates

(57) ABSTRACT

A beverage dispenser (10) with a beverage quantity indicating display (30) controlled by a microprocessor (66) in response to variations in capacitance of a plurality of sensing capacitors (72) detected by a capacitive sensing circuit (70) including one of a general purpose input/output integrated capacitive touch-key sensor, and a general purpose, integrated, input/output port expander with an integrated capacitive touch-key for reduced power consumption, sensitivity and reliability. A reference capacitor (C8) is located above the maximum height (52) of the beverage (74) to keep it spaced from the beverage (74) in air is used to compensate for changes in capacitance of the sensing capacitors (72) due to variations in temperature. All the capacitors (72, C8) are formed from pairs of planer conductive plates (54, 56) respectively mounted to opposed parallel interior surfaces (58, 60) of a sensing tube (36) attached to a down tube (34).

15 Claims, 9 Drawing Sheets

BEVERAGE DISPENSER WITH CAPACITIVE LEVEL SENSOR AND DISPLAY AND METHOD

CROSS REFERENCE TO RELATED APPLICATION

This application claims the benefit under 35 U.S.C. 119(e) of provisional patent application No. 61/163,603, filed Mar. 26, 2009, and bearing the same title as the present application, and claims the benefit under 35 U.S.C. 120 of pending application Ser. No. 12/250,963 filed Oct. 14, 2008, and entitled "Beverage Dispenser with Level Measuring Apparatus and Display" which claims the benefit under 35 U.S.C. 119(e) of provisional application No. 60/999,682, filed Oct. 19, 2007, all of which applications together with any associated appendices, exhibits or the like, are hereby incorporated by reference.

BACKGROUND OF THE INVENTION

1. Field of the Invention

This invention generally relates to opaque insulated beverage dispensers with faucets for dispensing beverage and, more particularly, to such dispensers with a beverage quantity electronic display and related methods of determining and displaying quantity.

2. Discussion of the Prior Art

Beverage dispensers of the type that are specially fitted to directly receive freshly brewed beverage, such as freshly brewed hot coffee, from a mating beverage brewer are well known in the commercial brewing field. Such beverage dispensers, which may hold one half to two gallons of beverage, are adapted to be portable. After being filled with beverage, they are detached from the brewer and moved to a serving location. Individual servings are removed from the dispenser through manual actuation of a faucet located at the bottom in the case of a regular gravity feed dispenser or by actuation of a pressurization arm in the case of an airpot dispenser with an elevated faucet. Because the serving locations are often removed from any source of electricity, the beverages are kept warm solely by air gap, vacuum or fiber insulation within double walls of the dispenser.

During the filing of the dispenser with hot beverage, an inlet opening to a funnel facing upwardly from a top cover of the dispenser is located beneath and adjacent to a drain hole of a brew basket of the brewer. An outlet of the funnel within the interior of the dispenser body is connected to a down tube that extends vertically downwardly from the funnel outlet to location adjacent the bottom of the dispenser. The fresh beverage received in the funnel is channeled to the bottom of the dispenser by the down tube to enhance mixing. The inlet to the funnel is closed with a closure member after being removed from the brewer to prevent loss of heat, spillage and contamination.

A problem with such insulated dispensers is that they are opaque, often made from stainless steel or the like, and consequently it is not possible to determine how much beverage remains in the dispenser after service has begun without opening the top.

Accordingly, it is known to provide electronic displays of the level or quantity of the beverage within the dispenser body that is responsive to level sensors contained within the body. It has been know to attach such sensors to the down tube. In U.S. Pat. No. 6,741,180, issued May 25, 2004, to Zbigniew G. Lassota for an invention in "Beverage Dispensing Urn with Electronic Measurement Display", which is hereby incorporated by reference, the sensors are resistive sensors mounted along the inside surface of the down tube at different levels to be detected and displayed. One sensor is beneath the lowest level being sensed and functions as a reference resistor that is intended to remain in contact with the beverage after the lowest level is sensed. In U.S. patent application Ser. No. 12/250,963 filed Oct. 14, 2008, by the present inventor and others, entitled "Beverage Dispenser with Level Measuring Apparatus and Method", hereby expressly incorporated by reference, a double-walled, cylindrical resistive sensor is incorporated into the body of the down tube. In U.S. patent application Ser. No. 10/999,283 filed Nov. 30, 2004, by Zbigniew G. Lassota for an invention entitled "Air Pot beverage Dispenser with Flow Through Lid and Display and Method", hereby expressly incorporated by reference, the sensors are capacitive sensor elements in the form of single capacitive plates that form capacitors with the beverage when the beverage is located at the same level as, and opposite, the capacitive sensor elements. The capacitance of a capacitive circuit changes as the beverage moves in and out of position adjacent and opposite the plate of the capacitive sensor.

A problem with this known capacitive-type level sensor is that the capacitances of the capacitors change with changes in temperature of the beverage to give a false reading. A problem with the resistive-type levels sensor is that the resistive, conductive element must be in direct contact with the beverage which can lead to corrosion and circuit failure. Also, in known sensing circuits have not been able to take advantage of existing off-the-shelf integrated circuitry. A problem with known capacitive sensing circuits is that their power consumption results in relatively rapid depletion of the battery. This is due in part to the use of relatively large capacitors that have been believed needed for accurate sensing and a failure to take advantage of the low power consumption, accuracy and reliability off-the-shelf micro-integrated circuitry.

SUMMARY OF THE INVENTION

In accordance with the present invention, a dispenser with a capacitive level sensing display assembly and a method of sensing that overcomes or ameliorates the foregoing disadvantages of known beverage dispensers noted above and otherwise.

This object is achieved in part by provision of a beverage dispenser having an opaque insulated body with an open top for receipt of beverage and a closed bottom for holding a preselected maximum quantity of beverage within the insulated body and a faucet for serving beverage from the dispenser, with a beverage quantity indicating assembly, having an electronic display for indicating the quantity of beverage contained within the insulated body up to the preselected maximum quantity, a plurality of sensing capacitors located at different sensing levels respectively corresponding to different quantities of beverage within the insulated body, all of the sensing levels being beneath a preselected maximum beverage level corresponding to the preselected maximum quantity of beverage within the insulated body, a reference capacitor located within the insulated body at a location above the maximum beverage level for providing a reference for changes in capacitance due to changes in temperature, an electronic capacitive sensing circuit connected with, and responsive to, both the reference capacitor and each of the plurality of sensing capacitors to provide capacitance sensing signals representative of the capacitance of the each of the reference capacitors and the sensing capacitors, a controller responsive to the capacitive sensing signals to control the electronic display to indicate an amount of beverage within the insulated body.

Preferably, the beverage dispenser includes an elongate sensor tube contained within the hollow body and having opposite open ends for receipt of beverage within the tube and a pair of opposite interior surfaces space apart from each other and extending between an upper open end adjacent the open top of the insulated body, and an open bottom end adjacent the bottom of the insulated body. The reference capacitor and each of the sensing capacitors is formed from a pair of conductive plates respectively mounted to the opposite interior surfaces directly across from each other. Advantageously, the interior surfaces are planer and parallel to each other, and the conductive plates of all the sensing capacitors and the reference capacitor are planer. Preferably, each of the capacitive plates is sandwiched between the interior surface and layer of protective plastic to prevent direct contact of the plates with the beverage.

Advantageously, the controller is responsive to changes in the capacitance of the reference capacitor due to changes of air temperature to compensate for changes in the capacitance of the sensing capacitors due to changes in temperature.

The object of the invention is also partly acquired by provision of a beverage dispenser having an opaque insulated body with an open top for receipt of beverage and a closed bottom for holding a preselected maximum quantity of beverage within the insulated body and a faucet for serving beverage from the dispenser, with a beverage quantity indicating assembly, including an electronic display for indicating the quantity of beverage contained within the insulated body up to the preselected maximum quantity, a plurality of sensing capacitors located at different sensing levels respectively corresponding to different quantities of beverage within the insulated body, an electronic capacitive sensing circuit connected with, and responsive to, both the reference capacitor and each of the plurality of sensing capacitors to provide capacitance sensing signals representative of the capacitance of the each of the reference capacitors and the sensing capacitors, said electronic capacitive sensing circuit including one of (a) a general purpose input/output integrated capacitive touch-key sensor, and (b) a general purpose, integrated, input/output port expander with an integrated capacitive touch-key, and a controller responsive to the capacitive sensing signals to control the electronic display to indicate an amount of beverage within the insulated body.

Preferably, the electronic capacitive sensing circuit includes a wake-up feature that only intermittently queries each input/output to reduce power consumption. The wake-up feature causes the capacitive sensing circuit to operate in a relatively low power consumption state except for periodic brief moment when the capacitive sensing signals are sent. Also, preferably, the controller includes a microprocessor which is operated in a relatively low power consumption state except during the periodic brief moments when the capacitive signals are being sent.

The object of the invention is also obtained in part by providing a beverage dispenser having an opaque insulated body with an open top for receipt of beverage and a closed bottom for holding a preselected maximum quantity of beverage within the insulated body and a faucet for serving beverage from the dispenser, with a beverage quantity indicating assembly, having an electronic display for indicating the quantity of beverage contained within the insulated body up to the preselected maximum quantity, an elongate sensor tube contained within the hollow body, said sensor tube having an open top end adjacent the top of the insulated body for passage of air, an open bottom adjacent the bottom of the insulated body for receipt of beverage, and a pair of parallel, opposite, inwardly facing, planer, interior surfaces spaced apart and facing each other and extending between the open top and the open bottom of the insulated body, a plurality of sensing capacitors mounted to the sensor tube in spaced relationship along the planer interior surfaces at different sensing levels respectively corresponding to different quantities of beverage within the insulated body; each of the sensing capacitors being formed from a pair of planer, parallel conductive plates respectively mounted to the opposite, interior surfaces directly across from each other.

Preferably, the sensor tube is mounted to the exterior surface of the down tube to avoid contact with beverage passing downwardly though the down tube. A reference capacitor is located within the insulated body at a location above the maximum beverage level for providing a reference for changes in capacitance due to changes in temperature and an electronic capacitive sensing circuit connected with, and responsive to, both the reference capacitor and each of the plurality of sensing capacitors to provide capacitance sensing signals representative of the capacitance of the each of the reference capacitors and the sensing capacitors. A controller is responsive to the capacitive sensing signals to control the electronic display to indicate an amount of beverage within the insulated body. The controller is responsive to changes in the capacitance of the reference capacitor due to changes of air temperature to compensate for changes in the capacitance of the sensing capacitors due to changes in temperature.

Preferably, each of the capacitive plates is protectively sealed against direct contact with the beverage between the interior surface, and an overlying layer of protective plastic to prevent direct contact of the plates with the beverage. The electronic capacitive sensing circuit is preferably one of (a) a general purpose input/output integrated capacitive touch-key sensor, and (b) a general purpose, integrated, input/output port expander with an integrated capacitive touch-key.

Again partly achieving the object of the invention, a method for indicating a quantity of beverage within the opaque body of a beverage dispenser having an opaque insulated body with an open top for receipt of beverage and a closed bottom for holding a preselected maximum quantity of beverage within the insulated body and a faucet for serving beverage from the dispenser, is provided by performance of the steps of locating a plurality of sensing capacitors at different sensing levels within the body respectively corresponding to different quantities of beverage within the insulated body, all of the sensing levels being beneath a preselected maximum beverage level corresponding to the preselected maximum quantity of beverage within the insulated body, locating a reference capacitor within the insulated body at a location above the maximum beverage level for providing a reference for changes in capacitance due to changes in temperature; connecting all the capacitors with an electronic capacitive sensing circuit connected with both the reference capacitor and each of the plurality of sensing capacitors, responding with the sensing circuit to the capacitors to generate capacitance sensing signals representative of the capacitance of the each of the reference capacitors and the sensing capacitors, and responding with a controller to the capacitive sensing signals to control the electronic display to indicate an amount of beverage within the insulated body.

Moreover, the object of the invention is partly acquired by providing a method of indicating beverage quantity of beverage within a beverage dispenser having an opaque insulated body with an open top for receipt of beverage and a closed bottom for holding a preselected maximum quantity of beverage within the insulated body and a faucet for serving beverage from the dispenser, by performance of the steps of locating a plurality of sensing capacitors at different sensing levels respectively corresponding to different quantities of beverage within the insulated body, connecting an electronic capacitive sensing circuit connected with both the reference capacitor and each of the plurality of sensing capacitors to provide capacitance sensing signals representative of the capacitance of the each of the reference capacitors and the sensing capacitors, said electronic capacitive sensing circuit including one of (a) a general purpose input/output integrated capacitive touch-key sensor, and (b) a general purpose, integrated, input/output port expander with an integrated capacitive touch-key, and responding with a controller to the capacitive sensing signals to control an electronic display to indicate an amount of beverage within the insulated body.

Additionally, achievement of the object of the invention is accomplished by provision of a method of indicating the beverage quantity within the body of a beverage dispenser having an opaque insulated body with an open top for receipt of beverage and a closed bottom for holding a preselected maximum quantity of beverage within the insulated body and a faucet for serving beverage from the dispenser, by performing the steps of locating an elongate sensor tube contained within the hollow body, said sensor tube having, an open top end adjacent the top of the insulated body for passage of air, an open bottom adjacent the bottom of the insulated body for receipt of beverage, and a pair of parallel, opposite, inwardly facing, planer, interior surfaces spaced apart and facing each other and extending between the open top and the open bottom of the insulated body, mounting a plurality of sensing capacitors to the sensor tube in spaced relationship along the planer interior surfaces at different sensing levels respectively corresponding to different quantities of beverage within the insulated body, and forming each of the sensing capacitors from a pair of planer, parallel conductive plates respectively mounted to the opposite, interior surfaces directly across from each other; and indicating on an electronic display the quantity of beverage contained within the insulated body up to the preselected maximum quantity in response to the capacitance of each of the sensing capacitors.

BRIEF DESCRIPTION OF THE DRAWINGS

The foregoing advantageous features of the present invention are described with reference to the several figures of the drawing in which.

DETAILED DESCRIPTION

Figure 1:
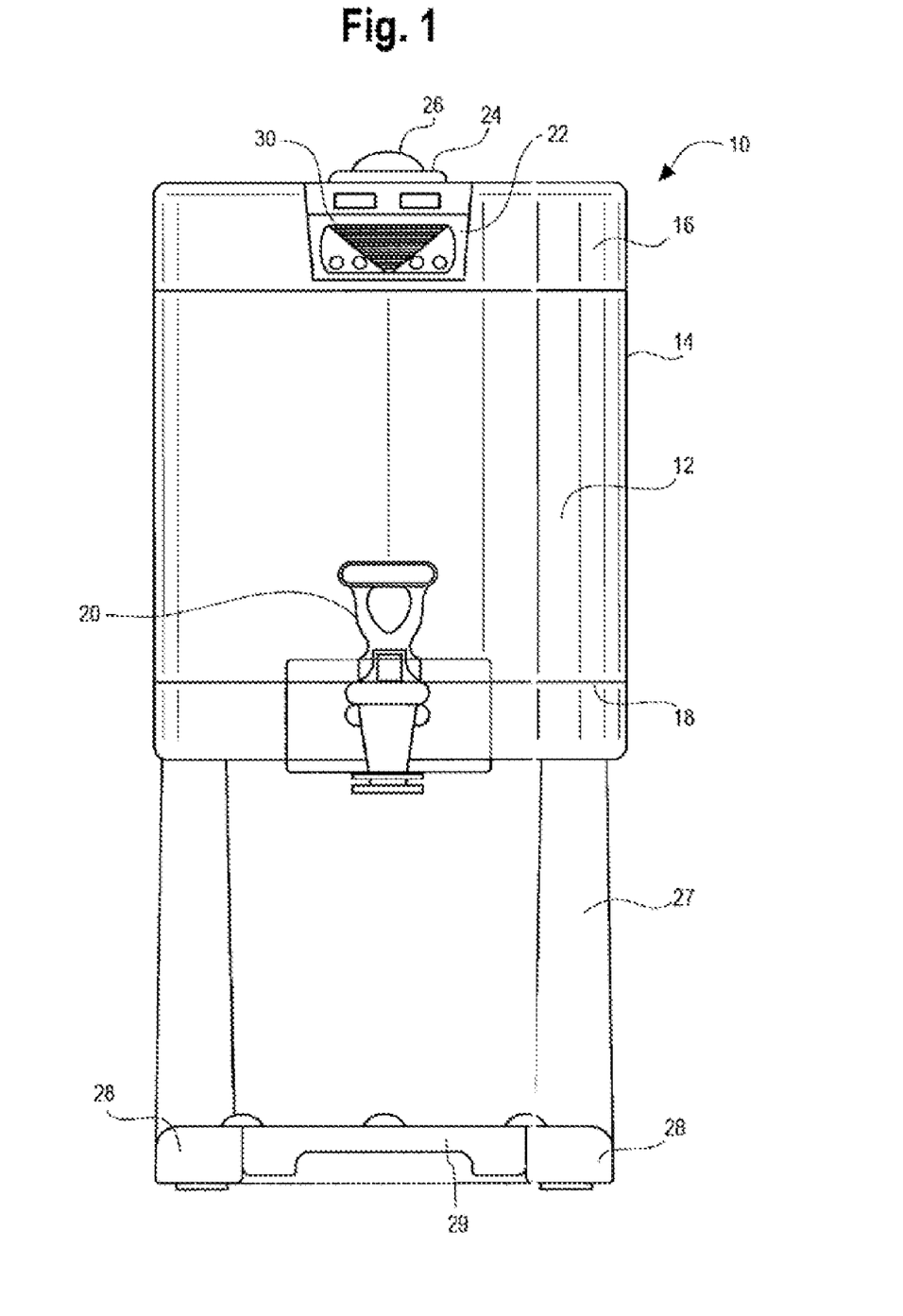
FIG. 1 is front elevation view of the preferred embodiment of the beverage dispenser of the present invention.
Figure 2:
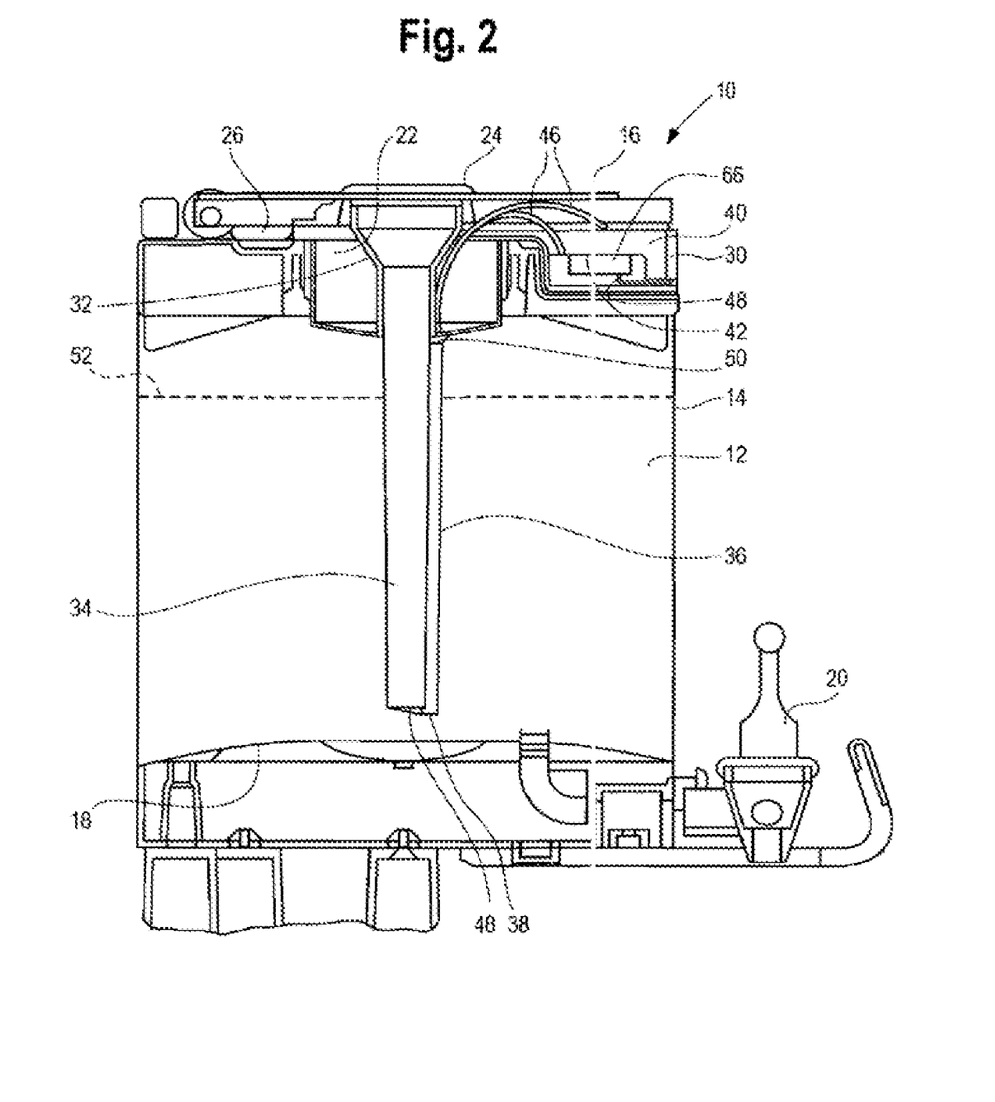
FIG. 2 is a cross sectional side elevation view of the dispenser of FIG. 1.

Referring to FIG. 1, a preferred embodiment of the quantity indicating beverage dispenser assembly 10 is seen to have an insulated, dispenser body 12 with a cylindrical sidewall 14 extending between a cylindrical top closure 16 and a bottom 18. A manually actuatable faucet 20 is mounted to the sidewall 14 adjacent the bottom 18 to selectively drain beverage from the dispenser body 12. Releasably mounted within a mounting hole in the top closure 16 is a funnel assembly 22 with a funnel inlet 24, selectively closed by a plug 26. When beverage is being received into the funnel inlet, the plug 26 is pivoted to a recessed position, as shown in FIG. 2, to enable the dispenser to be located closely beneath the drain hole of the mating beverage brewer (not shown), such as shown in U.S. Pat. No. 6,741,180, referenced above, and reference should be made thereto with respect to these details. The bottom 18 of the body 13 is supported by a U-shaped leg assembly 27 with two forwardly extending feet 28 between which is supported a drip tray container-support 29 for supporting cups or the like beneath the faucet 20.

Part of the funnel assembly 22 includes an electronic display 30, such as a liquid crystal display, that graphically or numerically displays the quantity of beverage within the body 12. Referring to FIG. 2, the funnel assembly 22 includes a funnel body 32 connected at its top the funnel inlet 24 and connected at its bottom to an elongate down tube 34 to which is attached a level sensing, elongate sensor tube 36. The down tube 34 has an upper open end connected to an outlet of the funnel body 30 and an open bottom end 38 for discharging hot beverage flowing through the down tube 34 adjacent the bottom 18 of the dispenser body 12. The electronic display 30 is supported at the front of a water proof circuitry compartment 40 within which is mounted circuit board 42 carrying a D.C. power supply, such as a dry cell battery, a microprocessor-based controller 66, wire connections 46 from capacitors within the sensor tube 36 and wire connections to the 48 to the electronic display 30. The sensor tube has an open bottom end 48 next to the open bottom end 38 of the down tube 34 to receive beverage as the level rises above the open bottom end 48. The sensor tube 34 also has an open top end 50 which is located above the highest level 52 reached by the beverage when the maximum amount rated for the dispenser, such a one gallon, is stored within the dispenser body 12.

Figure 3:
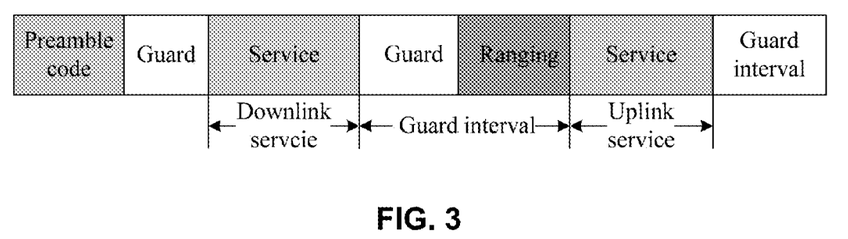
FIG. 3 is an enlarged front elevation view of the funnel assembly with down tube and sensor tube attached.

Referring to FIG. 3, the sensor tube 36 is attached to and extends along the length of the down tube 34 from the bottom end 38 to adjacent the top of the down tube 34. Protectively located within the interior of the sensor tube 36 and isolated from the interior of the down tube 34 are five substantially identical sensing capacitors respectively labeled C3, C4, C5, C6 and C7 that are spaced apart from each other by approximately the same distance. The uppermost sensing capacitor C8 is spaced beneath the open top 50 and beneath the maximum beverage level 52. The lowermost sensing capacitor C3 is located above the bottom open end 48. Located above the uppermost sensing capacitor and also above the maximum beverage level 52 is a reference capacitor labeled C8 that is never submerged beneath the beverage and remains in air at all times.

Figure 4:
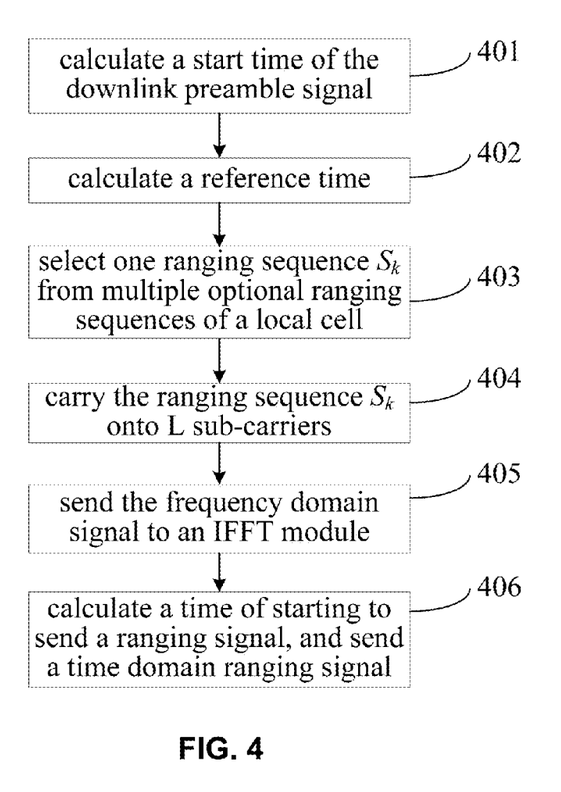
FIG. 4 is an enlarged cross sectional view of the sensor tube showing the relative location of the capacitive plates.

Referring to FIG. 4, which is a cross-section through section line IV-IV of FIG. 3, sensing capacitor C3 is seen to be formed from a pair of planer, parallel plates 54 and 56 which are respectively mounted flat against planer, parallel, opposed, spaced, interior surfaces of opposing walls 58 and 60 of the sensor tube 36. The inner capacitive plate 54 is protectively covered with a protective plastic layer 62, and outer capacitive plate 56 is protectively covered by a protective plastic layer 64 that sandwiches the plate between the wall and the plastic layer. The plastic layers may be fused to the walls of the sensor tube 36 to assist in maintaining the plates in position.

All of the sensing capacitors and the reference capacitor have the identical construction as described above with respect to sensing capacitors. They are preferably square or rectangular in shape with a width to provide a snug fit between the side walls of the sensor tube 36 to block relative lateral movement. The plates may be fitted into mating openings in the inside surfaces of the walls 58 and 60 with a depth to provide a flush fit of the top of the plate with the interior surfaces between plates.

Figure 5:
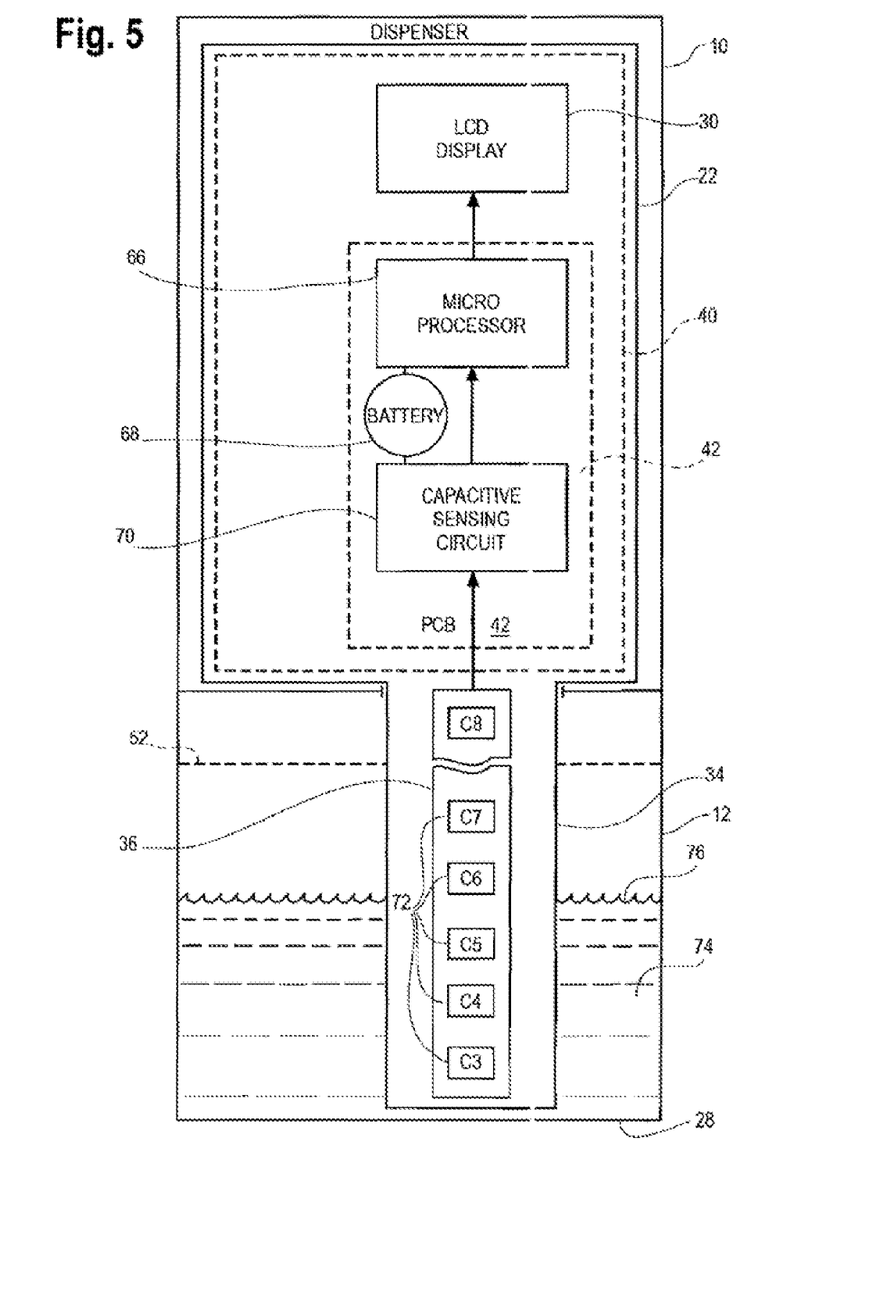
FIG. 5 is a functional block diagram of the preferred embodiment of the beverage dispenser of the present invention.

Referring to FIG. 4, the sensor tube 36 is open at opposite ends to allow receipt of beverage 18 within the narrow rectilinear sensor tube 36 but is not in direct fluid communication with the interior conduit of the down tube 34. The rectilinear sensor tube 36 is preferably made from plastic that is approved for contact with hot beverages. Likewise, the layer of protectively plastic overlying the plates is approved for contact with beverages. The plates do not come into actual contact with the beverage 18, but should also be approved for contact with hot beverages in case the protective plastic is breached Referring to FIG. 5, mounted on the printed circuit board 40 within the water tight compartment 40 are a microprocessor controller 66, a dry cell battery 68 and a capacitive sensing circuit 70 including suitable interface circuitry for providing capacitance signals to the microprocessor 66. When one of the sensing capacitors 72 is submerged beneath the actual beverage level 76, such as sensing capacitors C3, C4 and C5 shown in FIG. 5, some of the beverage 74 located within the sensor tube 36 is between the capacitive plates of the sensing capacitor 33. When a sensing capacitor 33 is not submerged, then there is only air between the capacitive plates. When there is only air between the plates of one of the sensing capacitors 33, its capacitance should be approximately the same as the capacitance of the reference capacitor C8, regardless of shifts in capacitance due to temperature variation.

The dielectric constant of air is significantly less than the dielectric constant of the beverage. The capacitance of each of the capacitors is dependent upon the dielectric constant between the capacitive plates, and thus the capacitance of each of the sensing capacitors changes depending upon whether the level 76 of the beverage 74 is beneath or below the location of the sensing capacitor. If there is beverage 74 between the plates then the capacitance is significantly higher than if there is only air. Thus, by measuring the capacitance of each of the sensing capacitors 33 it is possible to determine whether the beverage level 20 is above or beneath the location of that particular sensing capacitor.

The sensing capacitors are preferably equally spaced along the rectilinear sensor tube 36. When all of the sensing capacitors have a capacitance indicating that they are all submerged, then this indicates that the dispenser is full. When the lowest four of five of the sensing capacitors have a capacitance indicating that they are submerged but the highest capacitor C7 has a capacitance indicating that it is not submerged, then this is an indication that the dispenser is approximately four-fifths, or eighty percent full, etc. When all of the sensing capacitors have a capacitance that indicates that none are submerged then this indicates that the dispenser is empty or near empty. In the case of the beverage level of FIG. 5, the relatively high capacitance of the water filled capacitors C3, C4 and C5 compared to the relatively low capacitance of the air filled capacitors C6 and C7, indicates to the microprocessor 66 that the beverage level is between capacitors C6 and C5. The microprocessor 66 then converts this level to a particular graphic display that indicates the level on the display 30 to the user.

Preferably, all the capacitors have a nominal capacitance on the order of one picofarad and changes on the order of one-tenth of a picofarad are sensed by the capacitive sensing circuit described below. Preferably, the capacitors vary by an amount greater than one-tenth picofarad from when there is beverage between the plates to when there is only air between the plates. Because the sensor tube 36 and capacitors are separate from the down tube 34, the passage of beverage through the down tube 34 has no effect on the capacitors.

The capacitance of each of the sensing capacitors 33 will also change with changes of temperature, or possibly with thermal expansion or contraction of the sensor tube 36, and the reference capacitor C8, which is at the same general temperature as the sensing capacitor and subject to the same movements to which the sensing capacitors 33 may be subject due to changes in temperature, provides a reference signal that is used to compensate for such temperature induced fluctuations. Briefly, the reference capacitor C8 provides a base line capacitance level for when there is only air between the capacitive plates. The capacitance of a sensing capacitor 33 must at least exceed the capacitance of the reference capacitor C8 by a preselected amount, such as 0.025-picofarad for a nominal 1-picofarad capacitor that varies by approximately 0.1-picofarad, before the increase in capacitance is recognized, or interpreted, as meaning that there is beverage between the plates. The microprocessor controller 43 is programmed to perform this subtraction.

In accordance with an important aspect of the invention, the capacitive sensing circuit 66 mounted to the circuit card 42 employs either an integrated, general purpose input/output (GPIO) integrated capacitive touch-key sensor, or an integrated, general purpose, input/output port expander with an integrated, capacitive touch-key. One or the other of these integrated circuits is mounted to the circuit board 42, FIGS. 2 and 5, together with suitable interface circuitry to the microprocessor 66. While other integrated circuits may be used, preferably, the microprocessor 42 is a low power version of Atmel's Model STMEGA164P made by Atmel and operating at a frequency of 128 kHz.

If the capacitive sensing circuit 70 is a general purpose input/output port expander with integrated capacitive touch-key, it is preferably a Model STMPE821 made by ST Microelectronics of Schaumburg, Ill. The STMPE821 is a general purpose input/output port expander with an integrated capacitive touchkey controller. It is able to interface a main digital ASIC via a two-line bidirectional bus. It has up to eight GPIO's and up to eight touch key capacitive touch inputs to which the sensing and reference capacitors are connected.

The recommended applications are mobile and smart phones, portable media players and game consoles. A separated GPIO expander is often used in mobile multimedia platforms to solve the problem of there being too few GPIOs typically available on the digital engine. There is no recommended use for measuring capacitance of level sensing capacitors or the like, but it has been discovered by the inventor that it works quite in this application. In addition to surprisingly being useful for sensing capacitance measurement, as note, the STMPE821 was also selected because it has been designed with very low quiescent current and includes a wakeup feature for each I/O, to optimize the power consumption of the device. For more detailed and further information, reference should be made to the to the features and functions described in the specification attached as an Appendix to provisional patent application, 61/163,603 filed Mar. 26, 2009, on which this application is based, which is hereby incorporated by reference, or to other product literature available from ST Microelectronics at their websites.

Alternatively, the capacitive sensing circuit is a Model STMPE1208S, also made by ST Microelectronics, which is a twelve channel GPIO capacitive touch-key sensor. The Model STMPE1208S has twelve touch key capacitive sensors and twelve stand-alone GPIOs and thus may be more desirable to use if a greater number of sensing capacitors were desired than can be handled by the STMPE821. It also has ultra low power consumption. It senses changes in capacitance using a fully digital architecture, giving fast and accurate results. Automatic impedance calibration ensures that changes in environment do not affect the correct operation of the capacitive touch keys. The known applications are notebooks, computers, monitors, set-top boxes, televisions, mobile phones, smart phones, home entertainment and domestic appliances. The current use disclosed here is believed novel. For more detailed and further information, reference should be made to the to the features and functions described in the specification attached as an Appendix to provisional patent application, 61/163,603 filed Mar. 26, 2009, on which this application is based, which is hereby incorporated by reference, or to other product literature available from ST Microelectronics at their websites.

This novel use of such integrated GPIO circuits for capacitive level sensing substantially reduces the cost of production while increasing reliability and accuracy. The use of a GPIO to measure liquid levels in a dispenser is believed to be a new and unusual use that is unique. The GPIO has great flexibility, for each I/O can be configured as an input, an output or a capacitive sensing key. Advantageously, these integrated circuits have very low quiescent current. Also, as noted, these GPIO's include a wake-up feature for each I/O to minimize the power consumption of the device. The wake-up feature causes the capacitive sensing circuit 70 to operate in a relatively low power consumption state except for periodic brief moments when the capacitive sensing signals are sent. Likewise, in accordance with the invention, the microprocessor 66 is operated in a relatively low power consumption state except during the periodic brief moments when the capacitive signals are being sent.

Preferably, the microprocessor 66 receives signals from the capacitive sensing circuit 70 through a Model I2C interface made by Phillips Electronics, and reference should be made to the Phillips Specifications and Application Notes, available online and which are hereby incorporated by reference for the details of this interface circuit. These signals are generated in response to the sensing capacitors C3 et seq. and the reference capacitor C8 that are interfaced with the GPIO and translates the signals to corresponding output signals that are used to control the LCD display 40. Battery power from battery 38 is provided to the printed circuit board 46 and power from the battery is selectively passed to the LCD display 40 through the microprocessor 42.

Figure 6:
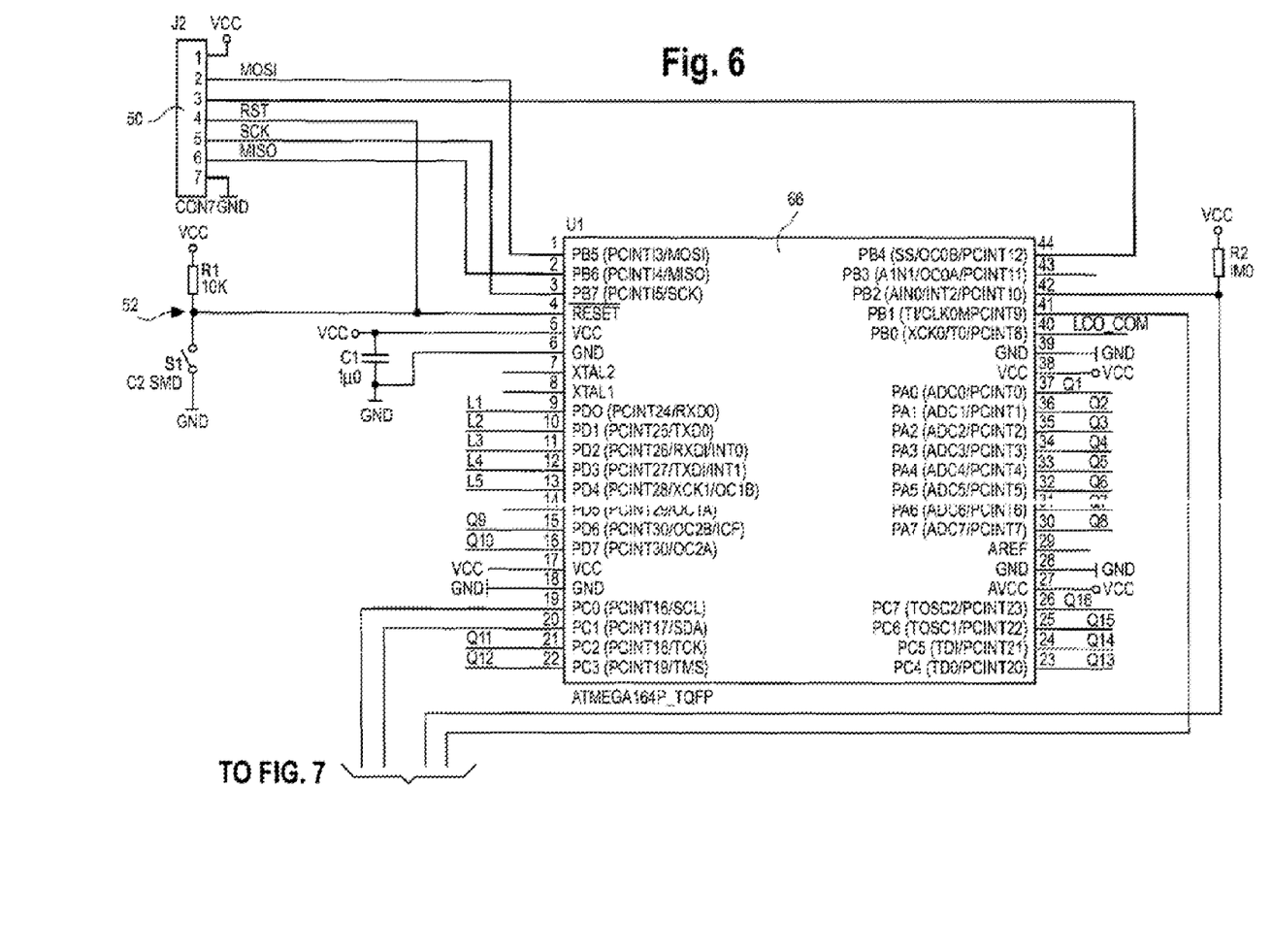
FIGS. 6-8 comprise a composite circuit diagram of the capacitive sensing circuit that is used in the beverage dispenser of FIG. 1.
Figure 7:
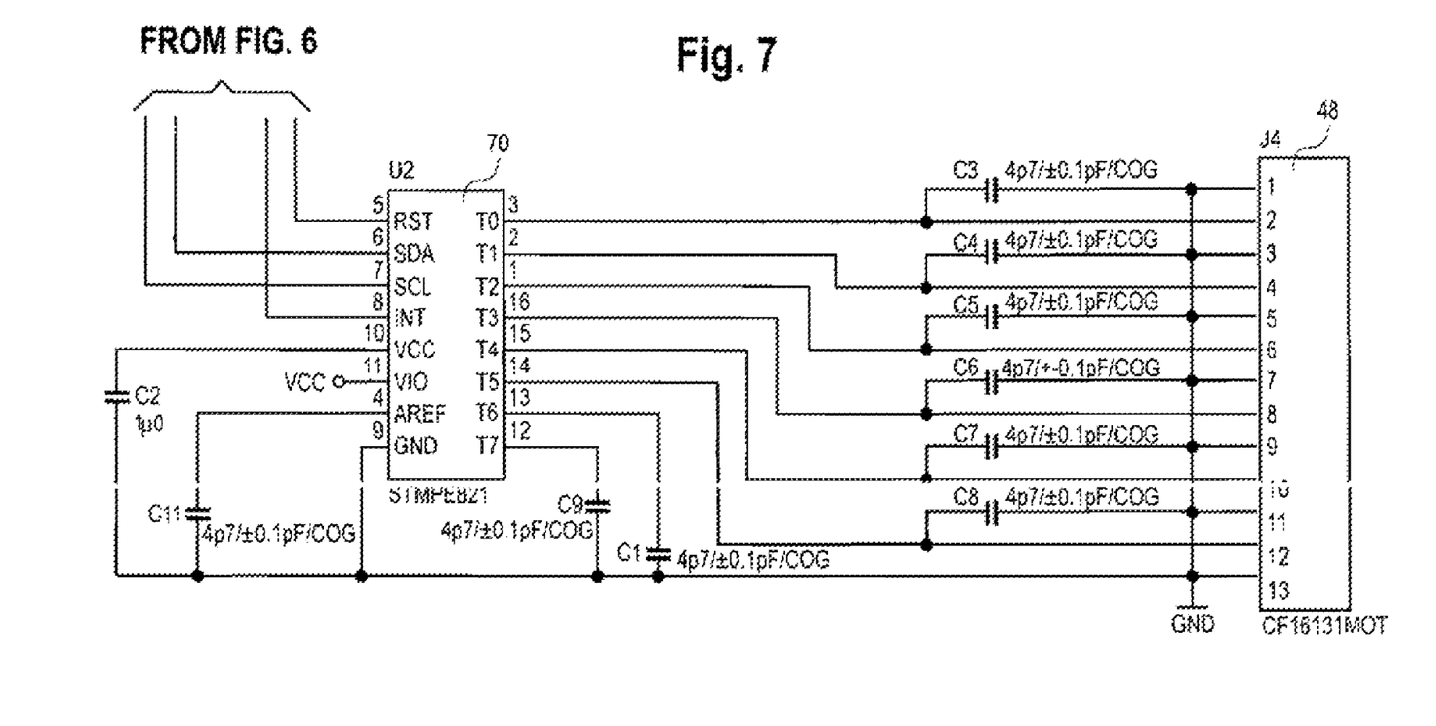
Figure 8:
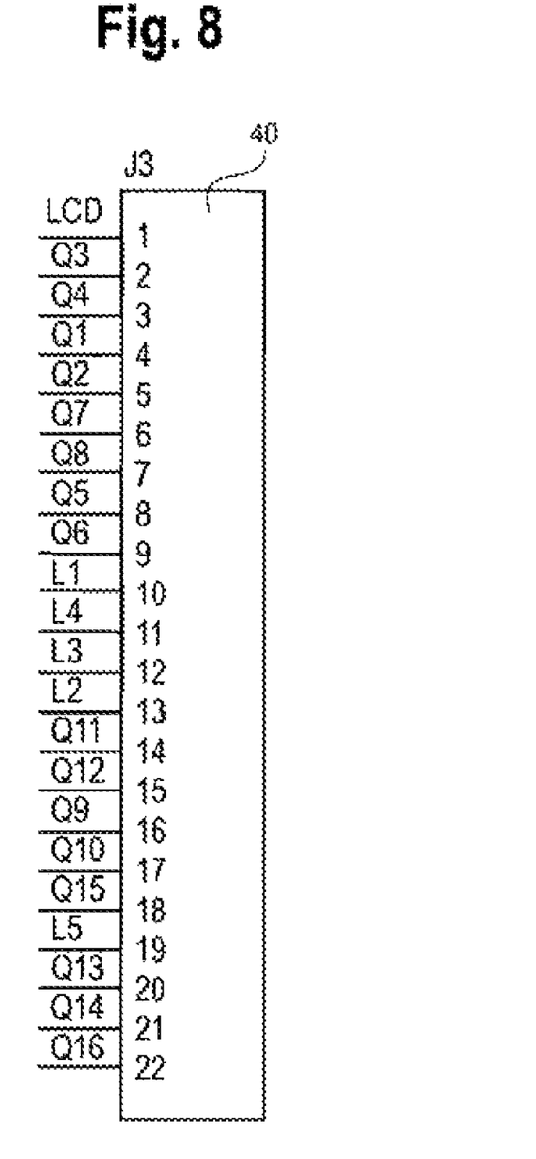

Referring now to FIGS. 6-8, which form a composite schematic wiring diagram, the connections between the various circuit elements are shown. A junction 48 labeled J4, FIG. 7, is a connector for connecting a flexible flat cable, or connection tape (not shown), to the sensing capacitors and reference capacitors C3, C4, C5, C6 and C7 and the reference capacitor C8. The interface between the junction 48 and the GPIO is through lines that are filtered against spikes with capacitors. Junction 48 is preferably provided for connecting a CF1613 Cvilux Non-ZIF flat flexible cable made by Motorola Corporation. A junction 50 labeled J@ is a connector used for programming the microprocessor 66 during production. A switch 52 has a magnetic actuatable switch labeled S1 that is a Model DI-80 G2 SMD. The switch is used to reset the microprocessor from the front cover with use of a magnet without the need of opening the waterproof electronics compartment 40.

The labeled inputs are connected to the outputs of the microprocessor 42 bearing the same label. In addition to the circuit elements shown in FIG. 1 and described above, there are suitable interface circuits and connections.

Figure 9:
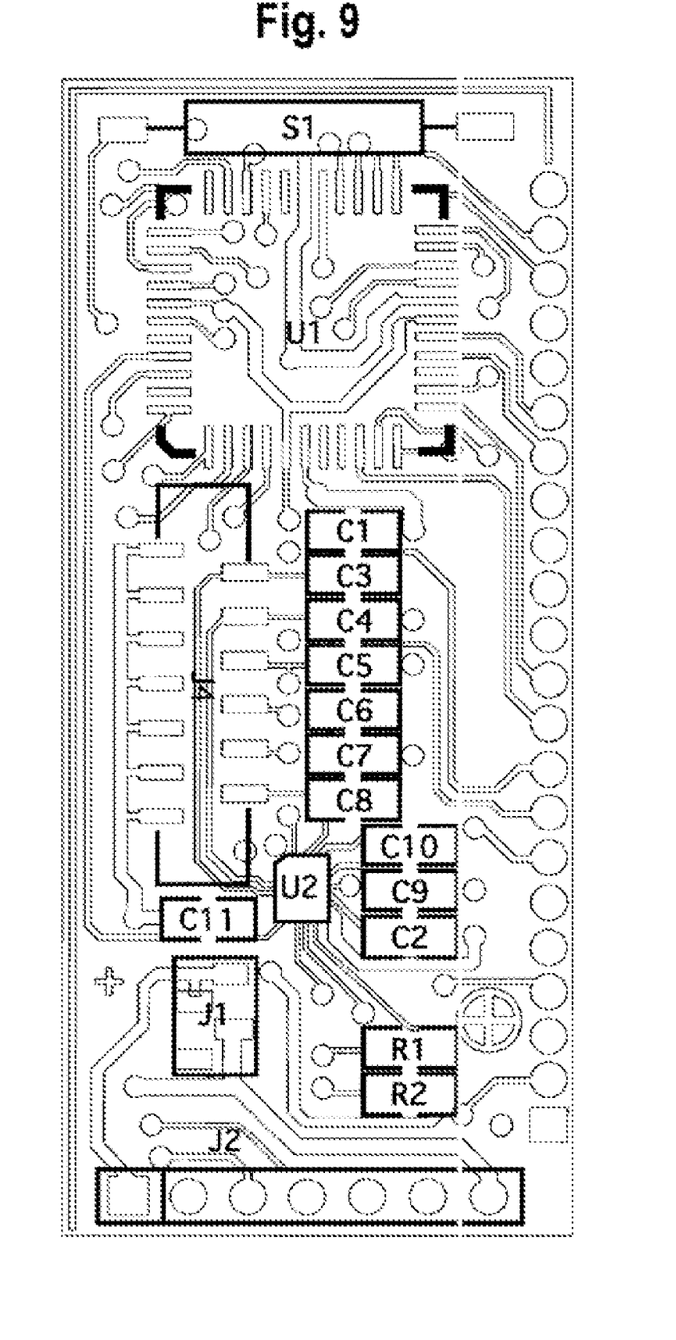
FIG. 9 is an enlarged portion of the circuit diagram of FIG. 6 showing the junction J3 of FIG. 6.

Referring now to FIG. 9, the various elements of the circuit shown in FIGS. 6-9 are shown as mounted to the printed circuit board 42, as shown.

Figure 10:
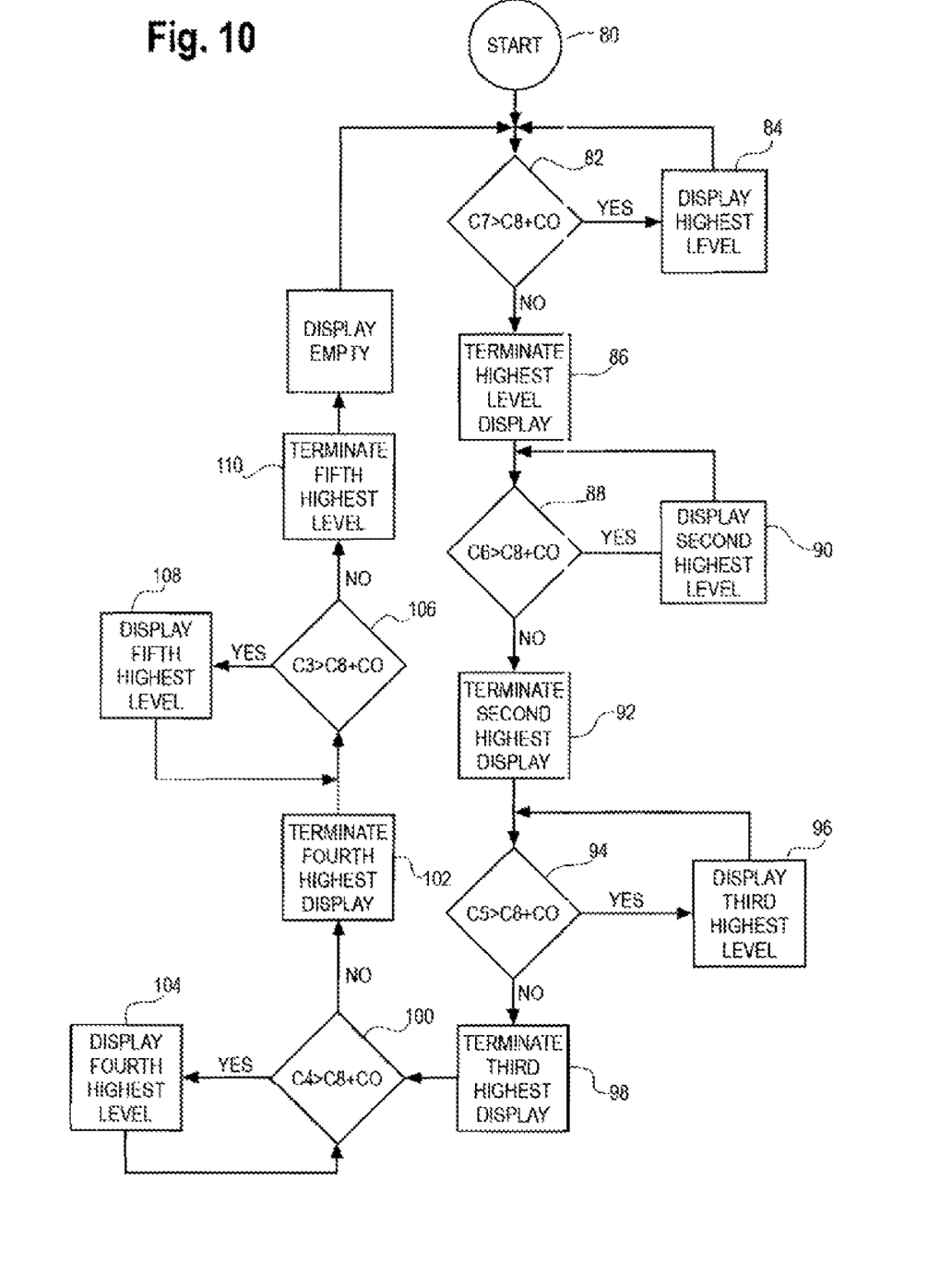
FIG. 10 is a logic flow chart of the software used in the microprocessor of FIG. 5 to measure the capacitors, adjust for variations due to temperature and control the electronic display in accordance with the measurements.

The microprocessor controller 66 is programmed with software that functions in accordance with the logic flow chart of FIG. 10. After start 80, a determination is made in step 82 as to whether the capacitance of the C7 sensing capacitor is larger than the capacitance of the reference capacitor C8 plus a preselected amount, indicating that the level of the beverage is at or above the level of the C7 capacitor. The value of Co is fixed minimum amount by which the capacitance of the reference capacitor must be exceeded to insure that minor manufacturing variations in capacitance levels of the different capacitors do not result in a false detection of beverage. However, the level of Co is sufficiently small to ensure that when beverage is present, the capacitance of C7 will exceed the total of the capacitance of the reference capacitor C8 plus Co.

If the inequality statement of step 82 is correct, then in step 84 the display is caused to indicate the highest level. If the inequality statement of step 82 is incorrect indicating that the beverage level is beneath the C7 capacitor, the highest level display is terminated in step 86 and the program advances to step 88 where a determination is made as to whether the next highest capacitor C6 is above or below the beverage level. If the beverage is present at this level then the capacitance of C6 will be larger than the capacitance of the reference capacitor C8 and Co. In such case, in step 90 the second highest level is displayed on the display 30. The logic recycles through steps 88 and 90 until the capacitance of C6 no longer exceeds the total of the capacitance of the reference capacitor C8 and the minimum offset capacitance level Co, and then moves on to step 92 where the second highest display is terminated. In step 94, the value of the capacitance of sensing capacitor C7 is tested and the third highest level is either displayed in step 96 or terminated in step 98. Once the beverage level falls beneath sensing capacitor C5, the program moves on to step 100 where the fourth highest level is displayed in step 102 or terminated in step 102 depending upon the capacitance of sensing capacitor C4. Once the beverage level falls beneath sensing capacitor C4, the program moves on to step 106 where the fifth highest level is displayed in step 108 or terminated in step 110, depending upon the capacitance level of sensing capacitor C3. Once the beverage level falls beneath sensing capacitor C4, the program moves on to step 100 where the fifth highest level is displayed in step 102 or terminated in step 102 and an indication of an empty dispenser is displayed. The empty display may be different from the other displays and include a flashing display to provide a clearer indication that the dispenser is empty.

While a particular embodiment has been shown in detail, it should be appreciated that minor alteration and changes may be made without departing from the spirit of the invention. While a graphic display is preferred, it will be appreciated that other types of displays, such as a numerical display of the number of standard sized servings remain in the dispenser, may be employed. While particular electronic devices have been identified, other electronic devices with comparable characteristic of sensitivity, reliability, temperature range and low power consumption may be used instead. While flat parallel plate capacitors are preferred, capacitors of other configurations could also be used.

The invention claimed is:

1. In a beverage dispenser having an opaque insulated body with an open top for receipt of beverage and a closed bottom for holding a preselected maximum quantity of beverage within the insulated body and a faucet for serving beverage from the dispenser, the improvement being a beverage quantity indicating assembly, comprising:
   an electronic display for indicating the quantity of beverage contained within the insulated body up to the preselected maximum quantity;
   a plurality of individual sensing capacitors located at different sensing levels respectively corresponding to different quantities of beverage within the insulated body, all of the sensing levels being beneath a preselected maximum beverage level corresponding to the preselected maximum quantity of beverage within the insulated body;
   a reference capacitor located within the insulated body at a location above the maximum beverage level for providing a reference for changes in capacitance due to changes in temperature;
   an electronic capacitive sensing circuit connected with, and responsive to, both the reference capacitor and each of the plurality of sensing capacitors to provide capacitance sensing signals representative of the capacitance of the each of the sensing capacitors, the capacitance sensing signals being adjusted to compensate for changes in capacitance of the reference capacitor due to changes of temperature of air within the body above the maximum beverage level and surrounding the reference capacitor; and
   a controller responsive to each of the adjusted capacitive sensing signals to control the electronic display to indicate an amount of beverage within the insulated body.

2. The beverage dispenser of claim 1 including
   an elongate sensor tube contained within the hollow body and having opposite open ends for receipt of beverage within the tube and a pair of opposite interior surfaces space apart from each other and extending between
      an upper open end adjacent the open top of the insulated body, and
      an open bottom end adjacent the bottom of the insulated body, and in which
   the reference capacitor and each of the sensing capacitors is formed from a pair of conductive plates respectively mounted to the opposite interior surfaces directly across from each other.

3. The beverage dispenser of claim 2 in which
   the interior surfaces are interior surfaces that are planer and parallel to each other, and
   the conductive plates of all the sensing capacitors and the reference capacitor are planer.

4. The beverage dispenser of claim 2 including
   a cover for closing the open top except for an inlet opening in the cover for direct receipt of beverage from a mating beverage brewer,
   an elongate down tube for passing freshly brewed beverage from the inlet to an open down tube outlet adjacent the bottom of the insulated body and having an exterior surface, and in which the sensor tube is mounted to the exterior surface of the down tube.

5. The beverage dispenser of claim 2 in which each of the capacitive plates is sandwiched between the interior surface and layer of protective plastic to prevent direct contact of the plates with the beverage.

6. The beverage dispenser of claim 1 in which the controller is responsive to changes in the capacitance of the reference capacitor due to changes of air temperature to compensate for changes in the capacitance of the sensing capacitors due to changes in temperature of the beverage related to changes in the temperature of the air.

7. The beverage dispenser of claim 1 in which the electronic capacitive sensing circuit is one of (a) a general purpose input/output integrated capacitive touch-key sensor, and (b) a general purpose, integrated, input/output port expander with an integrated capacitive touch-key.

8. The beverage dispenser of claim 7 in which the electronic capacitive sensing circuit includes a wake-up feature that only intermittently queries each input/output to reduce power consumption.

9. The beverage dispenser of claim 8 in which the wake-up feature causes the capacitive sensing circuit to operate in a relatively low power consumption state except for periodic brief moments when the capacitive sensing signals are sent.

10. The beverage dispenser of claim 9 in which the controller includes a microprocessor which is operated in a relatively low power consumption state except during the periodic brief moments when the capacitive signals are being sent.

11. The beverage dispenser of claim 1 in which each of the capacitors have individual pairs of plates that are spaced from and not interconnected with each other.

12. The beverage dispenser of claim 1 in which
   the interior surfaces are interior surfaces that are planer and parallel to each other, and
   the conductive plates of all the sensing capacitors and the reference capacitor are planer.

13. The beverage dispenser of claim 1 including
   a cover for closing the open top except for an inlet opening in the cover for direct receipt of beverage from a mating beverage brewer,
   an elongate down tube for passing freshly brewed beverage from the inlet to an open down tube outlet adjacent the bottom of the insulated body and having an exterior surface, and in which
   the sensor tube is mounted to the exterior surface of the down tube.

14. The beverage dispenser of claim 1 in which each of the capacitive plates is sandwiched between the interior surface and layer of protective plastic to prevent direct contact of the plates with the beverage.

15. The beverage dispenser of claim 1 including
   a reference capacitor is located within the insulated body, and in which
   the controller is responsive to changes in the capacitance of the reference capacitor due to changes of temperature to compensate for changes in the capacitance of the sensing capacitors due to changes in temperature.

* * * * *